United States Patent
Imai

(10) Patent No.: US 7,332,709 B2
(45) Date of Patent: Feb. 19, 2008

(54) PHOTOELECTRIC ENCODER

(75) Inventor: Toru Imai, Natori (JP)

(73) Assignees: Nikon Corporation, Tokyo (JP); Sendai Nikon Corporation, Notori-shi (JP)

(*) Notice: Subject to any disclaimer, the term of this patent is extended or adjusted under 35 U.S.C. 154(b) by 0 days.

(21) Appl. No.: 11/598,733

(22) Filed: Nov. 14, 2006

(65) Prior Publication Data

US 2007/0057168 A1    Mar. 15, 2007

Related U.S. Application Data

(63) Continuation of application No. PCT/JP2005/022876, filed on Dec. 13, 2005.

(60) Provisional application No. 60/736,308, filed on Nov. 15, 2005.

(30) Foreign Application Priority Data

| Dec. 13, 2004 | (JP) | ............................. 2004-360089 |
| May 10, 2005 | (JP) | ............................. 2005-137591 |
| Dec. 12, 2005 | (JP) | ............................. 2005-357658 |

(51) Int. Cl.
    *G01D 5/34*    (2006.01)

(52) U.S. Cl. ........................... 250/231.14; 250/231.13; 250/231.16; 250/237 G; 356/616; 356/617

(58) Field of Classification Search ................................ 250/231.13–231.18, 237 G; 356/616, 617; 33/1 PT, 1 N, 1 L; 341/11, 13
See application file for complete search history.

(56) References Cited

U.S. PATENT DOCUMENTS

| 5,680,211 | A | | 10/1997 | Kaneda et al. | |
| 5,977,539 | A | * | 11/1999 | Holzapfel et al. | ...... 250/237 G |
| 6,958,469 | B2 | * | 10/2005 | Ishizuka | ................. 250/231.16 |
| 7,019,282 | B2 | * | 3/2006 | Atsuta et al. | ........... 250/231.16 |
| 7,022,974 | B2 | * | 4/2006 | Igaki et al. | ............ 250/231.13 |

FOREIGN PATENT DOCUMENTS

| JP | A-57-203905 | 12/1982 |
| JP | A-06-194124 | 7/1994 |
| JP | A-2002-243503 | 8/2002 |

* cited by examiner

*Primary Examiner*—Davienne Monbleau
(74) *Attorney, Agent, or Firm*—Oliff & Berridge, PLC

(57) ABSTRACT

A photoelectric encoder includes a light source of an illumination light beam. The encoder also includes a movable grating which has grating lines and which is displaceable in a direction intersecting the grating lines. An index grating serves as a reference for displacement of the movable grating. A light-receiver receives the illumination light beam via the movable grating and the index grating. A modulator periodically changes a light beam outgoing from the index grating. A displacement detector detects the displacement of the movable grating based on the illumination light beam received by the light-receiver. Accordingly, a signal representing the displacement of a movable body can be accurately generated even when fluctuation of the attitude of the grating occurs.

22 Claims, 11 Drawing Sheets

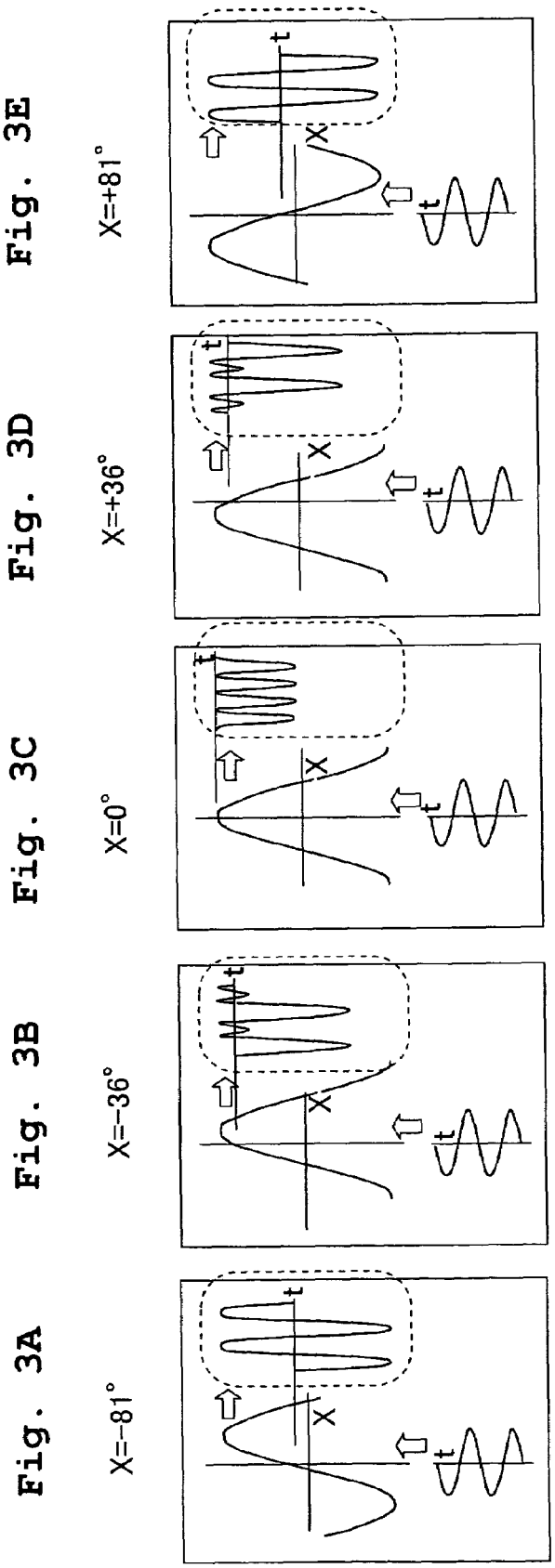

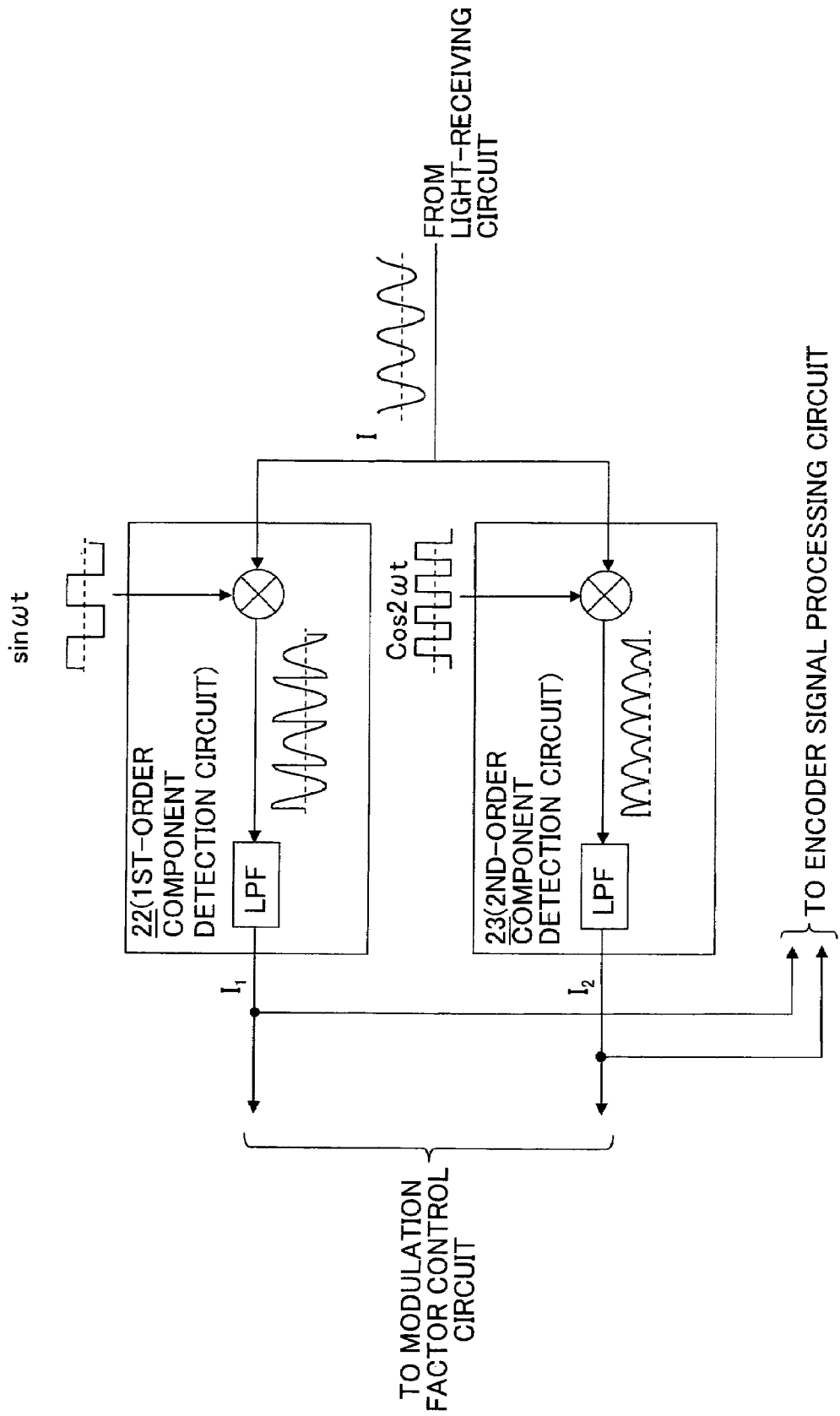

X=-81°	X=-36°	X=0°

PHOTOELECTRIC ENCODER

CROSS-REFERENCE

This application is a Continuation Application of International Application No. PCT/JP2005/022876 which was filed on Dec. 13, 2005 claiming the conventional priority of Japanese patent Application Nos. 2004-360089 filed on Dec. 13, 2004, 2005-137591 filed on May 10, 2005, and 2005-357658 filed on Dec. 12, 2005; and claiming the priority of U.S. Provisional Application No. 60/736,308 filed on Nov. 15, 2005.

BACKGROUND OF THE INVENTION

1. Field of the Invention

The present invention relates to a photoelectric encoder.

2. Description of the Related Art

A photoelectric encoder, in which the displacement of a movable member is converted into a signal, is disclosed in Japanese Patent Application Laid-open No. 2002-243503. In the case of the photoelectric encoder, illumination light beams are projected onto a movable grating or grid (reference numeral 15 shown in FIG. 1 of Japanese Patent Application Laid-open No. 2002-243503) which is movable together with the movable member and an index grating or grid (reference numeral 14 shown in FIG. 1 of Japanese Patent Application Laid-open No. 2002-243503) which is fixed. The intensities of the illumination light beams transmitted through the both gratings are detected by a light-receiving element (reference numeral 16 shown in FIG. 1 of Japanese Patent Application Laid-open No. 2002-243503) as the information to indicate the amount of discrepancy between the both gratings. The output signal from the light-receiving element is periodically changed in accordance with the movement of the movable grating. Accordingly, it is possible to detect the minute displacement (moving) amount of the movable member from the intensity of the signal.

In general, the following artifice is applied to the photoelectric encoder of this type. That is, the intensities of the respective illumination light beams individually transmitted through the respective areas on the movable grating and the index grating are individually detected by a plurality of light-receiving surfaces of the light-receiving element. Further, the arrangements of the grating patterns of the movable grating and the index grating are designed so that the discrepancy amount between the gratings is deviated little by little between the areas. In this case, the output signals from the respective light-receiving surfaces are periodically changed respectively at mutually different phases in accordance with the movement of the movable member. Therefore, it is possible to detect the amount of movement and the direction of movement (i.e., the displacement) of the movable member according to the intensities of the signals.

SUMMARY OF THE INVENTION

However, in this photoelectric encoder, the illumination light beams, which are transmitted through the mutually different areas on the movable grating, are used in order to generate the signals which have the mutually different phases. Therefore, when the posture or attitude of the movable grating is fluctuated, the following problem arises. That is, the phase relationship between the signals is fluctuated, and thus the accuracy of detection of the displacement is deteriorated. Accordingly, an object of the present invention is to provide a photoelectric encoder which makes it possible to correctly generate a signal which represents the displacement of a movable member even when any posture fluctuation arises in the grating.

According to a first aspect of the present invention, there is provided a photoelectric encoder comprising: a light source which radiates an illumination light beam; a movable grating which has grating lines and which is displaceable in a direction intersecting the grating lines; an index grating which serves as a reference for displacement of the movable grating; a light-receiver which receives the illumination light beam via the movable grating and the index grating; a modulator which periodically changes a light outgoing from the index grating; and a displacement detector which detects displacement of the movable grating based on the illumination light beam received by the light-receiver.

In the photoelectric encoder described above, the modulator may periodically modulate a relative positional relationship between the index grating and the illumination light beam incoming into the index grating. In the photoelectric encoder described above, the modulator may periodically change a position of the index grating. In the photoelectric encoder described above, the modulator may periodically change an angle of the illumination light beam radiated from the light source into one of the index grating and the movable grating.

In the photoelectric encoder described above, the light source may be capable of radiating the illumination light beam as a plurality of illumination light beams having mutually different angles, and the modulator may periodically switch the plurality of illumination light beams. In the photoelectric encoder described above, each of the movable grating and the index grating may be a diffraction grating, and an optical system may be arranged to form a grating image of the index grating on the movable grating by a pair of diffracted light beams generated by the index grating.

In the photoelectric encoder described above, the modulator may periodically change a position of one of a projection image and a grating image of the index grating on the movable grating. In the photoelectric encoder described above, the optical system may include a reflection member which deflects the pair of diffracted light beams respectively so as to overlay the pair of diffracted light beams in a same area on the movable grating. In the photoelectric encoder described above, the modulator may periodically change a phase difference between the pair of diffracted light beams. In the photoelectric encoder described above, the modulator may perform periodic change of the light with a waveform in which rising and falling are symmetrical with each other; and the displacement detector may extract, as a signal of the displacement, a specified frequency component of time-dependent change of an intensity of the illumination light beam received by the light-receiver.

In the photoelectric encoder described above, the modulator may perform periodic change of the light with a waveform in which rising and falling are asymmetrical with each other; and the displacement detector may extract, as a signal of the displacement, a phase of time-dependent change of an intensity of the illumination light beam received by the light-receiver. In the photoelectric encoder described above, the displacement detector may further include a control unit which generates a signal of an amplitude of periodic change of the light together with a signal of the displacement and which monitors the signal of the amplitude and controls the modulator to make the signal of the amplitude to be constant.

In the photoelectric encoder described above, the displacement detector may further include a control unit which generates a signal of a light amount of the illumination light beam together with a signal of the displacement and which monitors the signal of the light amount and controls the light source to make the signal of the light amount to be constant.

According to a second aspect of the present invention, there is provided a photoelectric encoder comprising: a light source which radiates an illumination light beam; a scale which has a pattern arranged in a predetermined direction; a reference member which makes displacement relative to the scale and which serves as a reference for the displacement; a light-receiver which receives the illumination light beam via the scale and the reference member; a modulator which periodically modulates the illumination light beam in a direction of the displacement during a period in which the scale and the reference member are relatively displaced; and a displacement detector which detects the relative displacement of the scale and the reference member based on the illumination light beam received by the light-receiver. In the photoelectric encoder described above, the modulator may periodically modulate a relative positional relationship between the reference member and the illumination light beam incoming into the reference member. In the photoelectric encoder described above, the modulator may periodically modulate an angle of incidence of the illumination light beam with respect to the reference member.

In the photoelectric encoders according to the first and second aspects of the present invention, the modulator may be an actuator which fluctuates one of the index grating and the illumination light beam which comes into the index grating. The light source may be a point light source array, and the modulator may drive point light sources of the point light source array. In the photoelectric encoder described above, the index grating may be irradiated with the illumination light beam to form one of a projection image and a grating image of the index grating on the movable grating.

EFFECT OF THE INVENTION

According to the present invention, the photoelectric encoder is realized, which makes it possible to reliably generate the signal representing the displacement of the movable member even when any posture fluctuation arises in the grating.

BRIEF DESCRIPTION OF THE DRAWINGS

FIGS. 3A to 3E show time-dependent change waveforms of an interference signal I when a displacement x of a movable diffraction grating 15 of the first embodiment has respective values.

FIG. 4 conceptually shows an extraction operation performed by a 1st-order component detection circuit 22 and a 2nd-order component detection circuit 23.

LEGENDS OF REFERENCE NUMERALS

11: light source, 11': point light source array, 12: collimator lens, 13: index diffraction grating, 13': index grating, 14A, 14B: mirror, 15: movable diffraction grating, 15': movable grating, 16: light-receiving element, 17: actuator, 21: light-receiving circuit, 22: 1st-order component detection circuit, 23: 2nd-order component detection circuit, 24: 3rd-order component detection circuit, 25: 4th-order component detection circuit, 26: clock circuit, 30: light source driving circuit, 31: zero-order component detection circuit, 32: light amount control circuit, 40: sawtooth wave-generating circuit.

DESCRIPTION OF THE PREFERRED EMBODIMENTS OF THE INVENTION

First Embodiment

Figure 1:
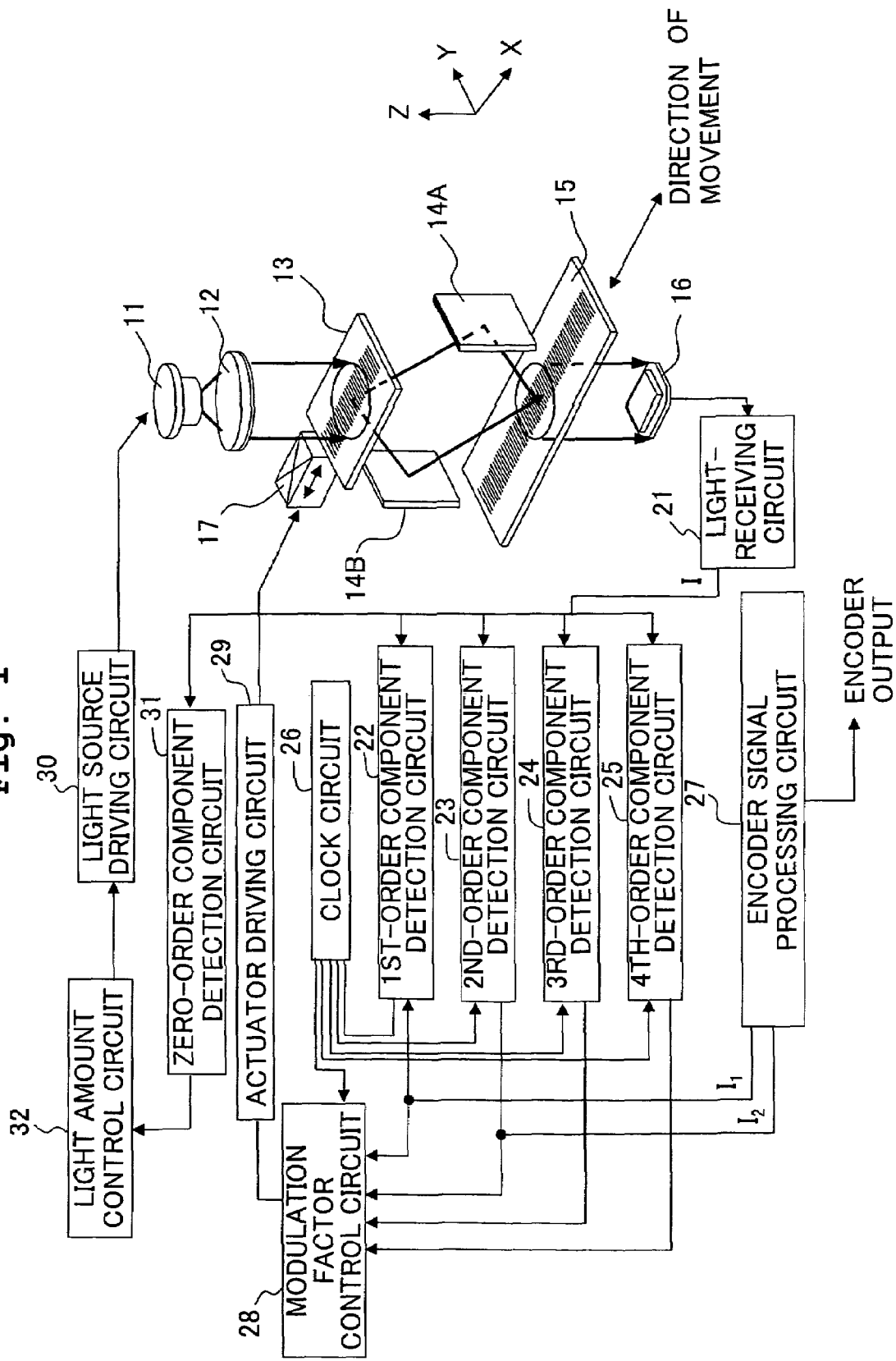
FIG. 1 shows a construction of an encoder according to a first embodiment.

A first embodiment will be explained below. This embodiment is directed to a photoelectric linear encoder of the diffracted light interference system. At first, a construction of the encoder of this embodiment will be explained. FIG. 1 shows the construction of this encoder. An optical system part (component) of the encoder of this embodiment includes, for example, a light source 11, a collimator lens 12, an index diffraction grating 13 as a reference member, mirrors 14A, 14B, a movable diffraction grating 15 as a scale, and a light-receiving element 16. The index diffraction grating 13 functions as an optical separator element which separates or divides the light beam radiated from the light source 11 into a plurality of light beams. The optical system part of the encoder of this embodiment is provided with an actuator 17 for vibrating the index diffraction grating 13. The index diffraction grating 13 is vibrated in the direction which is perpendicular to the grating lines and which is parallel to the surface, of the index diffraction grating 13, on which the grating is formed.

The light source 11 is a laser light source which emits or radiates, for example, a laser beam having a wavelength λ=850 nm. The index diffraction grating 13 and the movable diffraction grating 15 are transmission type diffraction gratings, which are, for example, phase type diffraction gratings. The grating pitch p of the index diffraction grating 13 is mutually the same as that of the movable diffraction grating 15, which is set to be not more than 50 μm, for example, about 8 μm. The actuator 17, which functions as a modulator, is constructed of, for example, a piezoelectric element. The actuator 17 is capable of making vibration at a vibration width or amplitude of several μm and a frequency of about 20 to 30 kHz.

In particular, the mutual positions of the light source 11, the collimator lens 12, the mirrors 14A, 14B, the light-receiving element 16, and the actuator 17 are fixed. On the contrary, the movable diffraction grating 15 is displaced together with an unillustrated movable member (measurement objective). The direction of the displacement is parallel to the surface of the movable diffraction grating 15 on which the grating is formed, and is perpendicular to the grating lines. FIG. 1 shows an XYZ rectangular coordinate system of the right-handed scale in which the X direction is the direction of movement of the movable diffraction grating 15, the Y direction is the grating line direction of the movable diffraction grating 15, and Z direction is the normal line direction of the movable diffraction grating 15. The following explanation will be made as based on the use of the rectangular coordinate system, if necessary.

Other than the above, the encoder of this embodiment has a circuit part (component) which includes, for example, a light-receiving circuit 21, a 1st-order component detection circuit 22, a 2nd-order component detection circuit 23, a 3rd-order component detection circuit 24, a 4th-order component detection circuit 25, a clock circuit 26, an encoder signal processing circuit 27, a modulation factor control circuit 28, an actuator driving circuit 29, a light source driving circuit 30, a zero-order component detection circuit 31, and a light amount control circuit 32.

Next, the operation of the optical system part of the encoder of this embodiment will be explained. The light source 11 emits the illumination light beam. The illumination light beam is converted into a parallel light beam by the collimator lens 12, then is allowed to come into the index diffraction grating 13 to brought about the diffracted light beams of the respective orders in accordance with the diffracting function of the index diffraction grating 13. The index diffraction grating 13 generates the ±1st-order diffracted light beams on the basis of the light beam allowed to come thereinto. The index diffraction grating 13 is formed with the diffraction grating of the phase type which does not generate any light beam other than the ±1st-order diffracted light beams, for example, the zero-order light beam, the ±2nd-order diffracted light beams, and the higher-order diffracted light beams or which generates the zero-order light beam, the ±2nd-order diffracted light beams, and the higher-order diffracted light beams which are extremely weak as compared with the intensities of the ±1st-order diffracted light beams. The ±1st-order diffracted light beams, which are generated by the index diffraction grating 13, are individually deflected by the mirrors 14A, 14B, and then they are overlaid or superimposed in a same area of the movable diffraction grating 15 to form a grating image of the index diffraction grating 13 in this area. That is, the ±1st-order diffracted light beams come into the same position of the movable diffraction grating 15. The ±1st-order diffracted light beams, which are allowed to come into this position, are further diffracted again by the diffracting function of the movable diffraction grating 15 to come into the light-receiving element 16 in a state of being interfered with each other. The light-receiving element 16 outputs a signal (hereinafter referred to as "interference signal I") which indicates the interference intensity of the interference light beam allowed to pass through the movable diffraction grating 15.

In the encoder of this embodiment as described above, the actuator 17 is driven during the period in which the movable diffraction grating 15 is displaced with respect to the index diffraction grating 13. When the actuator 17 is driven, then the position of the index diffraction grating 13 is periodically modulated in the X direction, and the phase difference between the ±1st-order diffracted light beams is periodically modulated. When the phase difference is periodically modulated, the phase of the grating image on the movable diffraction grating 15 is periodically modulated (and hence the bright/dark pattern of the grating image is periodically modulated in the X direction). Therefore, the interference signal I is changed in a time-dependent manner. This will be explained in detail below.

At first, a situation is assumed, in which the actuator 17 is not driven. In this situation, it is assumed that x represents the displacement of the movable diffraction grating 15 in the X direction on the basis of the index diffraction grating 13. On this assumption, the complex amplitude $I_+$ of the +1st-order diffracted light beam incoming into the light-receiving element 16 and the complex amplitude $I_-$ of the −1st-order diffracted light beam are represented by the following expressions (1) and (2). In this case, the light amount (amplitude) of the illumination light beam of each of the diffracted light beams is expressed by being normalized to 1. The symbol "j" indicates the unit complex number.

$$I_+ = \exp[2j\pi x/p] \quad (1)$$

$$I_- = \exp[-2j\pi x/p] \quad (2)$$

Therefore, the interference signal I is represented by the function of the displacement x of the movable diffraction grating 15 as represented by the following expression (3).

$$I = (1/2) \cdot |\exp[2j\pi x/p] + \exp[-2j\pi x/p]|^2 \quad (3)$$

Next, a situation is assumed, in which the actuator 17 is driven. In this situation, the index diffraction grating 13 is vibrated (periodically modulated) in the X direction on the basis of a predetermined position. The waveform (hereinafter referred to as "modulation waveform") of the position of the index diffraction grating 13, which is changed in a time-dependent manner during the modulation, is a sine wave (sin ωt) having an angular frequency ω and an amplitude ε (half amplitude: ε/2). In the following description, the modulation factor $2d = 2\pi\epsilon/p$ is defined as an index to indicate the wideness of the amplitude ε on the basis of the grating pitch p. According to the periodical modulation as described above, the phase of the +1st-order diffracted light beam and the phase of the −1st-order diffracted light beam are subjected to the modulation in the mutually opposite directions. In other words, the phase difference between the +1st-order diffracted light beam and the −1st-order diffracted light beam is modulated.

Therefore, in the encoder of this embodiment, the complex amplitude $I_+$ of the +1st-order diffracted light beam and the complex amplitude $I_-$ of the −1st-order diffracted light beam are represented by the following expressions (4) and (5).

$$I_+ = \exp[2j\pi x/p - j\pi\epsilon/p \cdot \sin(\omega t)] \quad (4)$$

$$I_- = \exp[-2j\pi x/p + j\pi\epsilon/p \cdot \sin(\omega t)] \quad (5)$$

The expressions (4) and (5) are represented by the following expressions (6) and (7) with the modulation factor $2d = 2\pi\epsilon/p$.

$$I_+ = \exp[2j\pi x/p - jd \cdot \sin(\omega t)] \quad (6)$$

$$I_- = \exp[-2j\pi x/p + jd \cdot \sin(\omega t)] \quad (7)$$

Therefore, the interference signal I is represented by the function of the time t and the displacement x of the movable diffraction grating 15 as represented by the following expression (8).

$$I = (1/2) \cdot |\exp[2j\pi x/p - jd \cdot \sin(\omega t)] + \exp[-2j\pi x/p + jd \cdot \sin(\omega t)]|^2 \quad (8)$$

-continued $$= 1 + \cos[4\pi x/p - 2d \cdot \sin(\omega t)]$$

$$= 1 + \cos(4\pi x/p) \cdot \cos[2d \cdot \sin(\omega t)] +$$

$$\sin(4\pi x/p) \cdot \sin[2d \cdot \sin(\omega t)]$$

When the expression (8) is arranged (subjected to the Bessel series expansion) in relation to the time t, the following expression (9) is obtained.

$$I=1+J_0(2d)\cdot\cos(4\pi x/p)+2J_1(2d)\cdot\sin(4\pi x/p)\cdot\sin(\omega t)+ \\ 2J_2(2d)\cdot\cos(4\pi x/p)\cdot\cos(2\omega t)+2J_3(2d)\cdot\sin(4\pi x/p) \\ \cdot\sin(3\omega t)+2J_4(2d)\cdot\cos(4\pi x/p)\cdot\cos(4\omega t)+ \ldots \quad (9)$$

Figure 2:
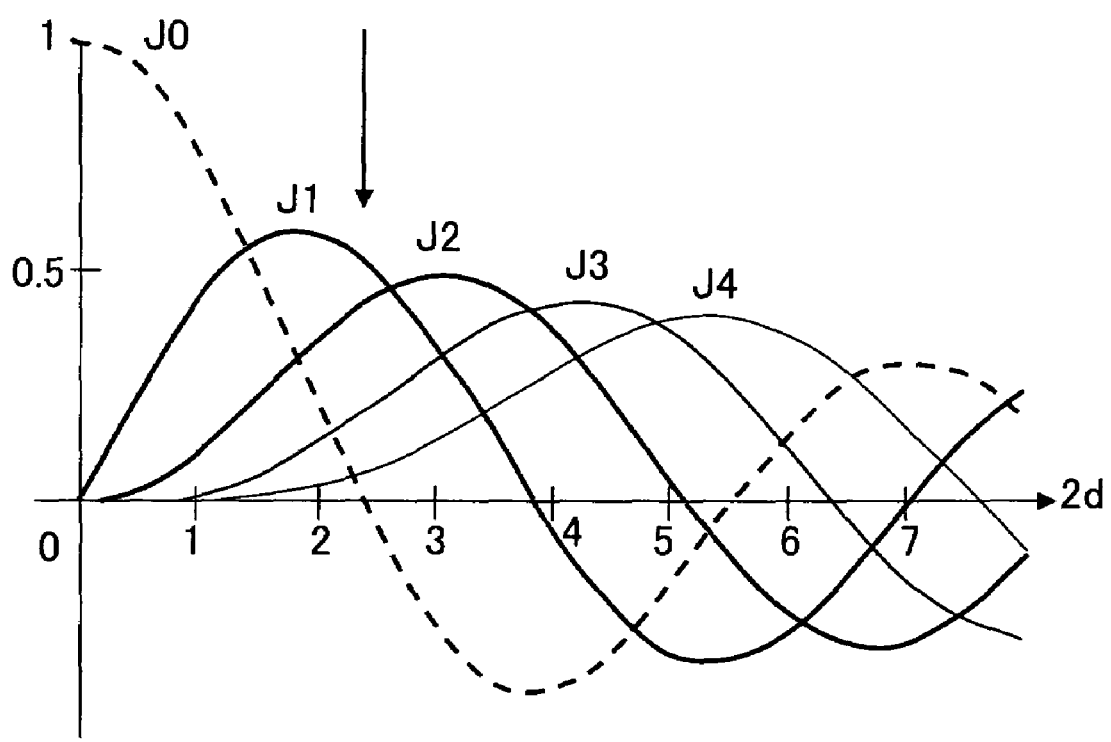
FIG. 2 shows a relationship between modulation factor 2d and Bessel expansion coefficient $J_n$ (n=1, 2, ...).

However, $J_n$ represents the nth-order Bessel expansion coefficient, which has a constant value provided that the modulation factor 2d is constant. Incidentally, the relationship between the modulation factor 2d and the Bessel expansion coefficient $J_n$ (n=1, 2, . . . ) is as shown in FIG. 2.

According to the expression (9), the zero-order component $I_0$, the 1st-order component $I_1$, the 2nd-order component $I_2$, the 3rd-order component $I_3$, and the 4th-order component $I_4$, . . . of the time-dependent change of the interference signal I are represented by the following expression (10) respectively. The zero-order component $I_0$ is the intensity of the frequency component which is not changed in the time-dependent manner. The nth-order component $I_n$ is the intensity of the frequency component which is changed in the time-dependent manner at the angular frequency nω.

$$I_0=1+J_0(2d)\cdot\cos(4\pi x/p),\ I_1=2J_1(2d)\cdot\sin(4\pi x/p),\ I_2=2J_2 \\ (2d)\cdot\cos(4\pi x/p),\ I_3=2J_3(2d)\cdot\sin(4\pi x/p),\ I_4=2J_4 \\ (2d)\cdot\cos(4\pi x/p),\ \ldots \quad (10)$$

Therefore, in the encoder of this embodiment, a specified frequency component (for example, 1st-order component $I_1$) and another specified frequency component (for example, 2nd-order component $I_2$) of the time-dependent change of the interference signal I can be used as the sine signal and the cosine signal to represent the displacement x at the phases shifted from each other by 90°. In other words, in the encoder of this embodiment, the interference signal I obtained from the light-receiving element 16 is changed in the time-dependent manner, although the encoder is provided with only one light-receiving element 16. Therefore, both of the sine signal and the cosine signal can be obtained from the time-dependent change.

Conventionally, distinct light-receiving elements have been separately used in order to obtain the sine signal and the cosine signal. Therefore, if the movable diffraction grating 15 is inclined, any discrepancy (factor of any measurement error) appears in the phase relationship between the sine signal and the cosine signal. On the contrary, in the encoder of this embodiment, the same light-receiving element 16 is used in order to obtain the sine signal and the cosine signal. Therefore, an effect is obtained such that any discrepancy (factor of any measurement error) does not appear in the phase relationship between the sine signal and the cosine signal even when the movable diffraction grating 15 is inclined.

In the encoder of this embodiment, the waveforms of the interference signal I changed in the time-dependent manner, which are provided when the displacement x of the movable diffraction grating 15 has the respective values, are as shown in FIG. 3. The waveforms of the interference signal I changed in the time-dependent manner, which are provided when the displacement x of the movable diffraction grating 15 (angular expression of the displacement x) is −81°, −36°, 0°, 36°, and 81°, are shown in frames depicted by dotted lines in FIGS. 3A, 3B, 3C, 3D, and 3E respectively. Upper-left drawings of FIGS. 3A, 3B, 3C, 3D, and 3E indicate the displacement of the movable diffraction grating 15 respectively; and lower drawings indicate modulation waveforms, i.e., waveforms of modulation to be applied to the index diffraction grating 13. Upper-right drawings surrounded by dotted lines indicate waveforms of the interference signal I obtained in the respective situations.

As appreciated from in FIG. 3, when the displacement x differs in the encoder of this embodiment, the intensity balance differs in relation to the respective frequency components contained in the waveform of the interference signal I changed in the time-dependent manner. In particular, when the displacement x is 0°, the intensity of the 2nd-order component (cos(2ωt)) is enhanced. Further, as the displacement x is larger in the plus direction, the intensity of the 1st-order component (sin(ωt)) is more enhanced. As the displacement x is larger in the minus direction, the intensity of the 1st-order component (−sin(ωt)) is more enhanced.

Incidentally, the waveform (upper-right part of FIG. 3A) of the interference signal I changed in the time-dependent manner, which is provided when the displacement x is −81°, amounts to the waveform formed by superimposing the modulation waveform (lower-left part of FIG. 3A) at the position of x=−81° with respect to the waveform brought about by the displacement x of the interference signal I during the period of no modulation (upper-left part of FIG. 3A). On the other hand, the waveform (upper-right part of FIG. 3B) of the interference signal I changed in the time-dependent manner, which is provided when the displacement x is −36°, amounts to the waveform formed by superimposing the modulation waveform (lower-left part of FIG. 3B) at the position of x=−36° with respect to the waveform brought about by the displacement x of the interference signal I during the period of no modulation (upper-left part of FIG. 3B).

Further, the waveform (upper-right part of FIG. 3C) of the interference signal I changed in the time-dependent manner, which is provided when the displacement x is 0°, amounts to the waveform formed by superimposing the modulation waveform (lower-left part of FIG. 3C) at the position of x=0° with respect to the waveform brought about by the displacement x of the interference signal I during the period of no modulation (upper-left part of FIG. 3C). On the other hand, the waveform (upper-right part of FIG. 3D) of the interference signal I changed in the time-dependent manner, which is provided when the displacement x is +36°, amounts to the waveform formed by superimposing the modulation waveform (lower-left part of FIG. 3D) at the position of x=+36° with respect to the waveform brought about by the displacement x of the interference signal I during the period of no modulation (upper-left part of FIG. 3D).

Further, the waveform (upper-right part of FIG. 3E) of the interference signal I changed in the time-dependent manner, which is provided when the displacement x is +81°, amounts to the waveform formed by superimposing the modulation waveform (lower-left part of FIG. 3E) at the position of x=+81° with respect to the waveform brought about by the displacement x of the interference signal I during the period of no modulation (upper-left part of FIG. 3E).

Next, the operation of the circuit part of the encoder of this embodiment will be explained. The light amount control circuit 32 drives and controls the light source 11 by the aid of the light source driving circuit 30. This control is performed so that the light amount of the illumination light beam is maintained to be constant.

The modulation factor control circuit (control unit) 28 provides a modulation signal composed of the sine wave to the actuator driving circuit 29 in accordance with the sine wave signal (sin ωt) having the angular frequency ω fed from the clock circuit 26 so as to drive and control the actuator 17. Accordingly, the position of the index diffraction grating 13 in the X direction is periodically modulated. In this control, the control is also performed so that the modulation factor 2d of the periodic modulation is maintained to have a constant value. The target value of the modulation factor 2d is set to "2.3". On this condition, the Bessel expansion coefficient "$J_0$" is 0 as shown by an arrow in FIG. 2.

The light-receiving circuit 21 continuously drives the light-receiving element 16. Further, the light-receiving circuit 21 continuously incorporates the interference signal I, which is outputted from the light-receiving element 16, to feed the interference signal I to the zero-order component detection circuit 31, the 1st-order component detection circuit 22, the 2nd-order component detection circuit 23, the 3rd-order component detection circuit 24, and the 4th-order component detection circuit 25 respectively. At least two of the detection circuits function as the units for detecting the displacement of the movable diffraction grating 15. The zero-order component detection circuit 31 extracts the zero-order component $I_0$ from the time-dependent change of the interference signal I which has been fed to the zero-order component detection circuit 31. The 1st-order component detection circuit 22 extracts the 1st-order component $I_1$ from the time-dependent change of the interference signal I. The 2nd-order component detection circuit 23 extracts the 2nd-order component $I_2$ from the time-dependent change of the interference signal I. The 3rd-order component detection circuit 24 extracts the 3rd-order component $I_3$ from the time-dependent change of the interference signal I. The 4th-order component detection circuit 25 extracts the 4th-order component $I_4$ from the time-dependent change of the interference signal I.

In particular, the extraction operation, which is performed by the 1st-order component detection circuit 22, the 2nd-order component detection circuit 23, the 3rd-order component detection circuit 24, and the 4th-order component detection circuit 25, is based on the synchronous detection or demodulation synchronized with the pulse signal fed from the clock circuit 26. FIG. 4 shows the concept of the extraction operation performed by the 1st-order component detection circuit 22 and the 2nd-order component detection circuit 23 which represent the circuits as described above. As shown in FIG. 4, a pulse signal having an angular frequency ω fed from the clock circuit 26 (shown as "sin ωt" in FIG. 4) is inputted into the 1st-order component detection circuit 22. The 1st-order component detection circuit 22 combines the pulse signal with the interference signal I fed from the light-receiving circuit 21. The combined signal is smoothened by a low pass filter (LPF) to extract the 1st-order component $I_1$.

On the other hand, a pulse signal (shown as "cos 2ωt" in FIG. 4), which has an angular frequency 2ω and which has a phase deviated by 90° from the phase of the pulse signal described above, is inputted into the 2nd-order component detection circuit 23 from the clock circuit 26. The 2nd-order component detection circuit 23 combines the pulse signal with the interference signal I fed from the light-receiving circuit 21. The combined signal is smoothened by a low pass filter (LPF) to extract the 2nd-order component $I_2$. The encoder signal processing circuit 27 shown in FIG. 1 incorporates the extracted 1st-order component $I_1$ and the 2nd-order component $I_2$, and generates the sine signal Ss which indicates the value of $\sin(4\pi x/p)$ and the cosine signal Sc which indicates the value of $\cos(4\pi x/p)$, on the basis of the components $I_1$, $I_2$, the Bessel expansion coefficients $J_1$, $J_2$ (constants), and the expression (10). The sine signal Ss and the cosine signal Sc are generated by the interference signal I obtained from the same light-receiving element 16 (generated by the illumination light beams allowed to pass through the identical area of the movable diffraction grating 15). Therefore, even if the posture of the movable diffraction grating 15 is fluctuated, the positional relationship between the both is not fluctuated.

The modulation factor control circuit 28 incorporates the extracted 1st-order component $I_1$, the 2nd-order component $I_2$, the 3rd-order component $I_3$, and the 4th-order component $I_4$ to monitor the modulation factor 2d of the periodic modulation actually performed in the encoder of this embodiment (i.e., the actually measured value of the modulation factor 2d) on the basis of the components $I_1$, $I_2$, $I_3$, $I_4$ and the expression (10) (the modulation factor 2d is represented by "$I_1/I_3$", "$I_2/I_4$"). Further, the modulation factor control circuit 28 controls the actuator driving circuit 29 in the direction in which the monitored modulation factor 2d approaches the target value "2.3" described above. Accordingly, the modulation factor 2d is maintained to have the constant value (2.3) (subjected to the feedback control).

The light amount control circuit 32 incorporates the extracted zero-order component $I_0$ to control the light source driving circuit 30 in the direction in which the fluctuation of the zero-order component $I_0$ is suppressed. Accordingly, the light amount of the illumination light beam is maintained to have the constant value (subjected to the feedback control). The reason, why the light amount can be controlled with ease, is that the target value of the modulation factor 2d is "2.3". When the modulation factor 2d is "2.3", then the Bessel expansion coefficient $J_0=0$ is given, and the zero-order component $I_0$ indicates the light amount (amplitude) itself. According to the feedback control as described above, the measurement condition of the optical system part is maintained to be constant during the period in which the periodic modulation is effected. Therefore, it is possible to highly accurately detect the signal required for the encoder of this embodiment (i.e., the time-dependent change of the interference signal I). Therefore, the sine signal Ss and the cosine signal Sc described above, which are generated in the encoder of this embodiment, correctly represent the displacement x of the movable diffraction grating 15.

In this embodiment, the ±1st-order diffracted light beams, which are generated by the index diffraction grating 13, are individually deflected by the mirrors 14A, 14B. However, in place of the mirrors 14A, 14B, it is also allowable to use, for example, an index diffraction grating having a grating pitch of ½ pitch with respect to the grating pitch of the index diffraction grating 13.

Second Embodiment

Figure 5A:
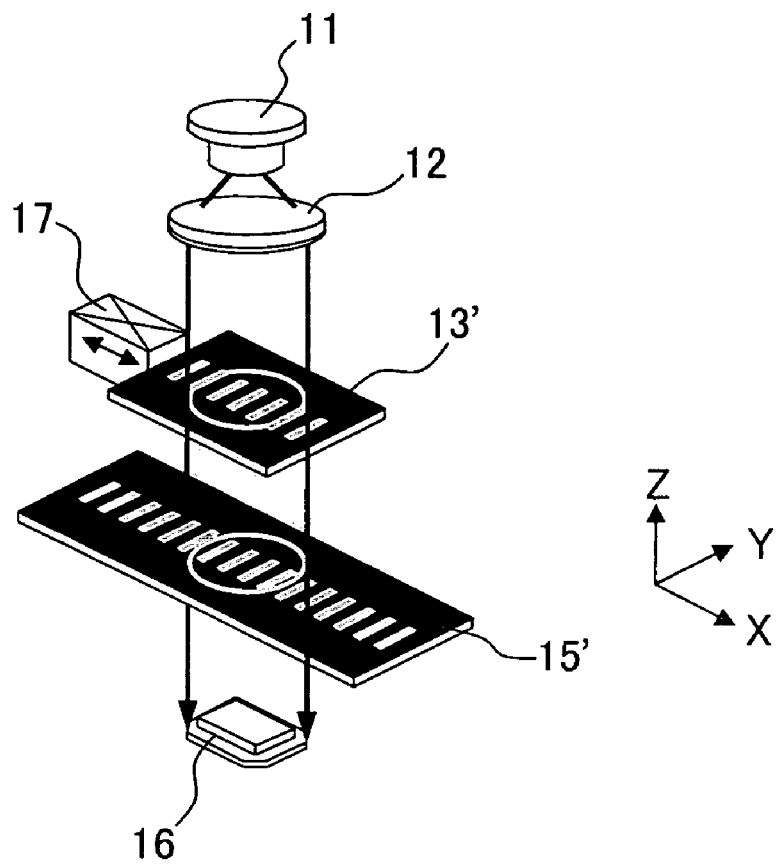
FIGS. 5A and 5B illustrate an encoder according to a second embodiment.

A second embodiment will be explained below. This embodiment relates to a photoelectric encoder of the shadowgraph system (slit shutter type). Only the difference from the first embodiment (FIG. 1) will be herein explained. The second embodiment differs from the first embodiment in the optical system part. FIG. 5A shows a construction of the optical system part of the encoder of this embodiment. As shown in FIG. 5A, the optical system part of this encoder includes, for example, a light source 11, a collimator lens 12, an index grating 13', a movable grating 15', a light-receiving element 16, and an actuator 17 for vibrating the index grating 13'. The position of the index grating 13' in the X direction is periodically modulated by using the same modulation waveform as that of the first embodiment.

However, the principle of the encoder of this embodiment is not based on the use of the interference function of the light. Therefore, it is enough that the image, which is formed on the movable grating 15', is not the grating image of the index grating 13', but the image is a simple projection image (so-called "shadow") of the index grating 13'. Therefore, it is unnecessary to provide the mirrors 14A, 14B for deflecting the pair of diffracted light beams. A light source, which has low coherence (for example, LED), can be used as the light source 11. Bright/dark gratings (gratings each formed of a light-shielding portion and a light-transmissive portion) having sufficiently large grating pitches are used as the index grating 13' and the movable grating 15'.

Next, the operation of the encoder of this embodiment will be explained. The illumination light beam, which is radiated from the light source 11, is converted into the parallel light beam by the collimator lens 12. The light beam is allowed to come into the index grating 13', and the light beam is transmitted through the bright portion of the grating. The illumination light beam, which is transmitted through the index grating 13', is allowed to come into the movable grating 15' to form the projection image of the index grating 13'. The illumination light beam, which is transmitted through both of the index grating 13' and the movable grating 15', is allowed to come into the light-receiving element 16. The light-receiving element 16 outputs a signal which indicates the incidence intensity of the illumination light beam (hereinafter referred to as "intensity signal f").

When the actuator 17 is driven in the above-described encoder of this embodiment, then the position of the index grating 13' is periodically modulated in the X direction, and the position of the projection image on the movable grating 15' is periodically modulated (and thus the bright/dark pattern of the projection image on the movable grating 15' is periodically modulated). Therefore, the intensity signal f fed from the light-receiving element 16 is changed in a time-dependent manner. In the case of the encoder of this embodiment, the intensity signal f is processed by an unillustrated circuit part in the same manner as the interference signal I of the first embodiment to extract, for example, the zero-order component $f_0$, the 1st-order component $f_1$, the 2nd-order component $f_2$, ... of the interference signal I.

In the case of the encoder of this embodiment, it is assumed that x represents displacement of the movable grating 15' in the X direction on the basis of the index grating 13', and f(x) represents a waveform which is changed depending on the displacement x of the of the intensity signal f during no modulation. On this assumption, the time-dependent change of the intensity signal f during the periodic modulation is subjected to the Taylor expansion as represented by the following expression (11). The modulation waveform of the encoder of this embodiment is designated as $d\sin(\omega t)$.

$$f[x, d\sin(\omega t)] = f(x) + f'(x) \cdot d \cdot \sin(\omega t) + \quad (11)$$
$$f''(x)/2 \cdot d^2 \cdot \sin^2(\omega t) + \ldots$$
$$= f(x) + f'(x) \cdot d \cdot \sin(\omega t) +$$
$$f''(x) \cdot d^2/4 \cdot [1 - \cos(2\omega t)] + \ldots$$

According to the expression (11), it is appreciated that the intensity of the 1st-order component $f_1$ of the time-dependent change of the intensity signal f is proportional to f'(x), and the intensity of the 2nd-order component $f_2$ is proportional to f''(x).

If the waveform "f(x)", which is changed depending on the displacement x of the intensity signal f during no modulation, is represented by the trigonometric function (for example, the waveform "f(x)" is represented by f(x)=cos (x)), there are given f'(x)=sin(x), f''(x)=−cos(x). Therefore, the time-dependent change of the intensity signal f of the encoder of this embodiment depicts a waveform which is the same as or equivalent to that of the time-dependent change of the interference signal I of the first embodiment. Accordingly, in the case of the encoder of this embodiment, the optical system part is designed, for example, such that the waveform "f(x)", which is changed depending on the displacement x of the intensity signal f during no modulation, is designated as f(x)=sin(x)−1/18·sin(3x) as the pseudo-sine signal.

Figure 5B:
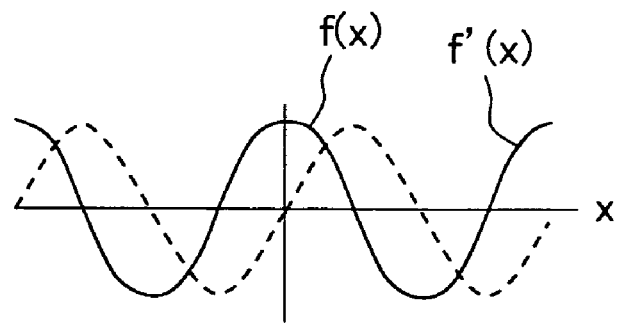

On this condition, the 1st-order component $f_1$, which is extracted by the encoder of this embodiment, is as shown in FIG. 5B. In FIG. 5B, the waveform, which is changed depending on the displacement x of the intensity signal f during no modulation, is shown with the same coordinate together with the waveform which is changed depending on the displacement x of the 1st-order component $f_1$. Therefore, also in the encoder of this embodiment, the sine signal Ss and the cosine signal Sc, which correctly represent the displacement x at the mutually different phases, can be generated in the same manner as in the first embodiment.

In this embodiment, the light beam, which is transmitted through the index grating 13', is allowed to come into the movable grating 15'. However, it is also allowable that the index grating 13' is arranged at the downstream (below) of the movable grating 15', and the position of the index grating 13' is modulated with the actuator 17.

Third Embodiment

A third embodiment will be explained below. This embodiment relates to a photoelectric encoder of the diffraction interference system. Only the difference from the first embodiment (FIG. 1) will be herein explained. The third embodiment differs from the first embodiment in the circuit part.

Figure 6:
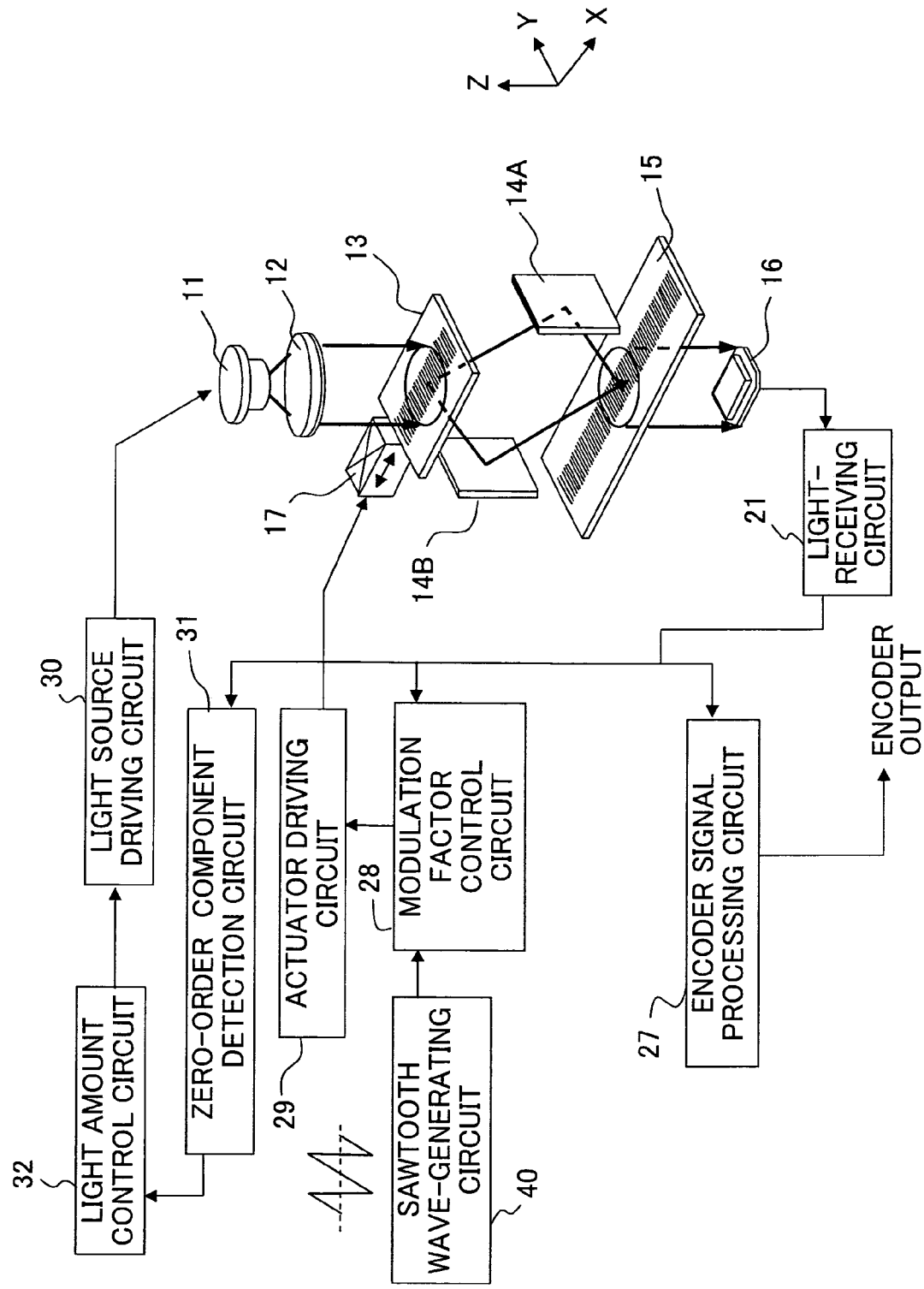
FIG. 6 shows a construction of an encoder according to a third embodiment.

FIG. 6 shows a construction of the encoder of this embodiment. The clock circuit 26, the 1st-order component detection circuit 22, the 2nd-order component detection circuit 23, the 3rd-order component detection circuit 24, and the 4th-orther component detection circuit 25 are omitted from the circuit part of the encoder of this embodiment. Instead, a sawtooth wave-generating circuit 40 is provided. The modulation factor control circuit (control unit) 28 applies, to the actuator driving circuit 29, a modulation signal adapted to a signal fed from the sawtooth wave-generating circuit 40 to drive and control the actuator 17. Accordingly, the position of the index diffraction grating 13 in the X direction is periodically modulated with a sawtooth-shaped modulation waveform. The modulation factor 2d of the periodic modulation is set to $2\pi$.

Figures 7A, 7B, 7C:
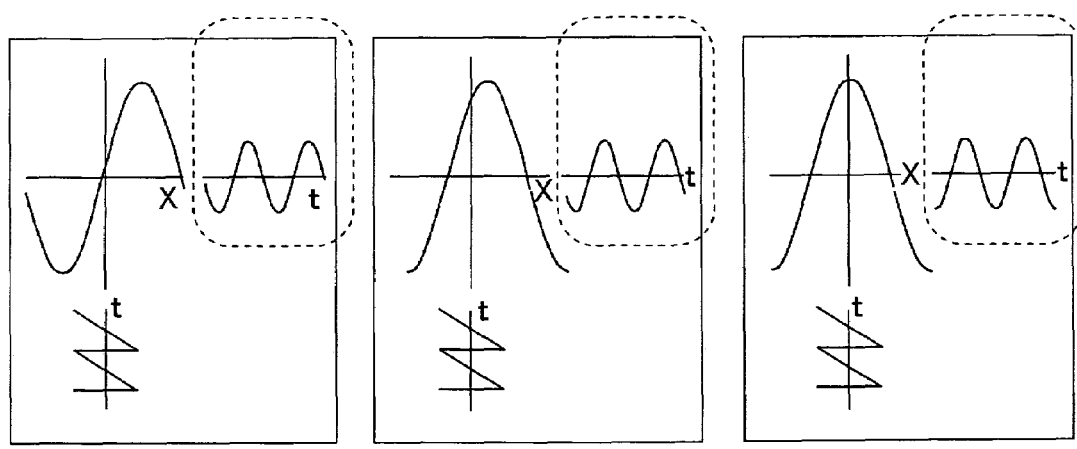
FIGS. 7A to 7C show time-dependent change waveforms of the interference signal I when a displacement x of a movable diffraction grating 15 of the third embodiment has respective values.

In the encoder of this embodiment constructed as described above, the waveforms of the interference signal I changed in the time-dependent manner, which are provided when the displacement x of the movable diffraction grating 15 have respective values, are as shown in FIG. 7. The waveforms of the interference signal I changed in the time-dependent manner, which are provided when the displacement x of the movable diffraction grating 15 (angular expression of the displacement x) is −81°, −36°, and 0°, are shown in frames depicted by dotted lines in FIGS. 7A, 7B, and 7C respectively. FIG. 7 is depicted in accordance with the same illustration method as that of FIG. 3.

As appreciated from FIG. 7, in the case of the encoder of this embodiment, even when the displacement x has any value, the waveforms of the interference signal I changed in the time-dependent manner are identical with each other. When the displacement x differs, only the phase differs. The light-receiving circuit 21 shown in FIG. 6 continuously drives the light-receiving element 16. Further, the light-receiving circuit 21 continuously incorporates the interference signal I outputted from the light-receiving element 16, and the signal is fed to the encoder signal processing circuit 27, the modulation factor control circuit 28, and the zero-order component detection circuit 31 respectively.

The encoder signal processing circuit 27 extracts the phase of the waveform from the time-dependent change of the interference signal I which has been fed. The phase represents the displacement x of the movable diffraction grating 15 itself. The modulation factor control circuit 28 monitors the presence or absence of the point of inflection of the waveform from the time-dependent change of the fed interference signal I. The modulation factor control circuit 28 controls the actuator driving circuit 29 so that the point of inflection is reduced. Accordingly, the modulation factor 2d is maintained to have a constant value ($2\pi$) (subjected to the feedback control).

The zero-order component detection circuit 31 extracts the zero-order component $I_0$ from the time-dependent change of the fed interference signal I. The light amount control circuit 32 incorporates the zero-order component $I_0$ to control the light source driving circuit 30 in the direction in which the fluctuation of the zero-order component $I_0$ is suppressed. Accordingly, the light amount of the illumination light beam is maintained to have a constant value (subjected to the feedback control). As described above, according to the encoder of this embodiment, it is possible to obtain the effect which is the same as or equivalent to that of the first embodiment, although the encoder of this embodiment has the relatively simple circuit construction.

This embodiment is provided by changing the circuit part of the first embodiment. However, it is also allowable that the circuit part of the second embodiment is changed in the same manner as described above. In this embodiment, the modulation factor 2d is set to $2\pi$. However, the same or equivalent effect can be obtained even when the modulation factor 2d is set to integral multiples of $2\pi$.

Other Embodiments

Figure 8:
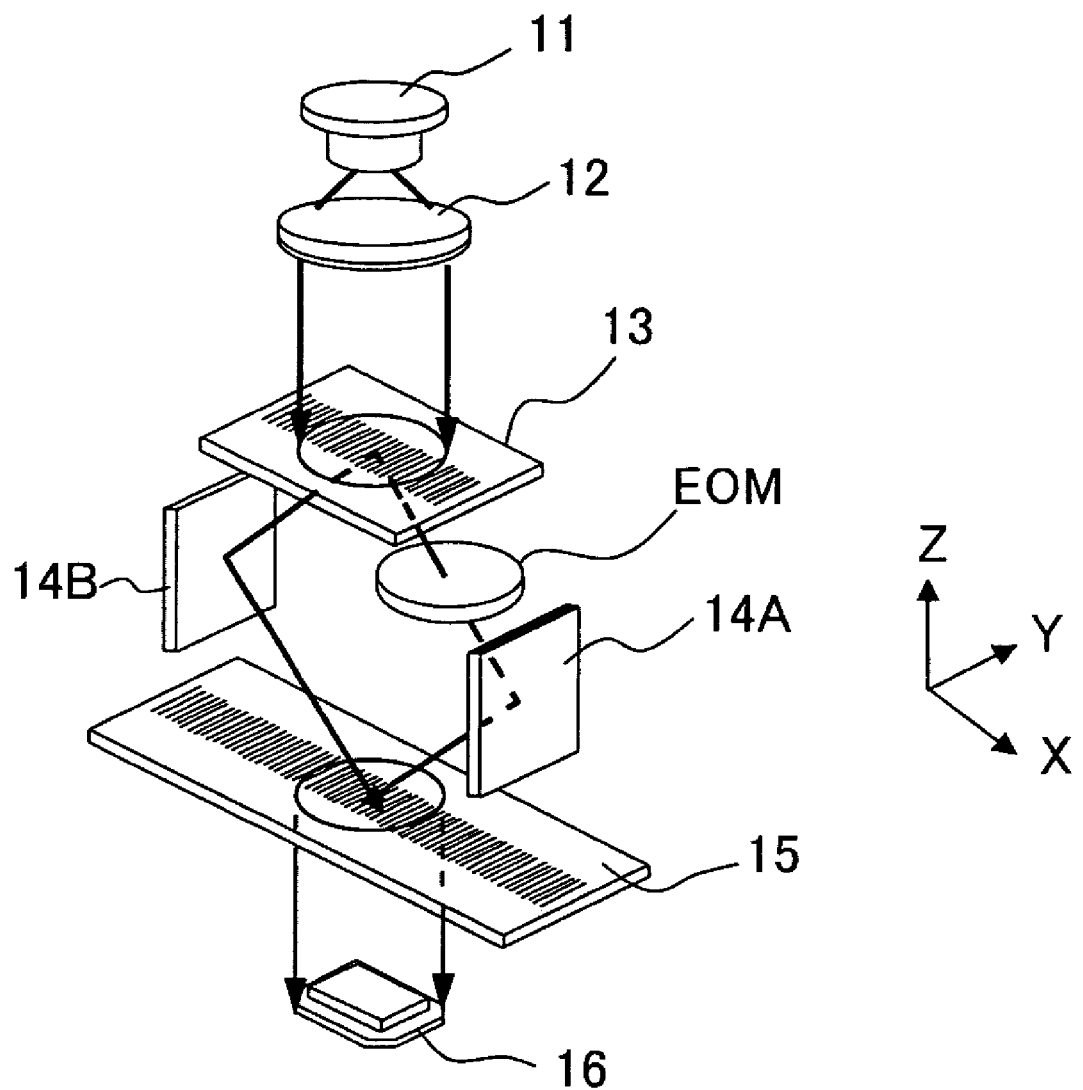
FIG. 8 shows a modification of the encoder according to the first embodiment or the third embodiment.

In the first embodiment or the third embodiment described above (encoder of the diffracted light beam interference system), the position of the index diffraction grating 13 is periodically modulated with the actuator 17 in order to periodically modulate the phase difference between the ±1st-order diffracted light beams (in order to periodically modulate the phase of the grating image). However, as shown in FIG. 8, the actuator 17 may be omitted, and an electrooptical modulator (EOM) or the like may be inserted into one of the optical paths for the ±1st-order diffracted light beams to periodically modulate the optical path length of one of the ±1st-order diffracted light beams. In this case, the electrooptical modulator corresponds to the modulator which periodically changes the light beam outgoing from the index grating. Also in this case, the phase difference between the ±1st-order diffracted light beams is periodically modulated. Therefore, the effect, which is the same as or equivalent to the effect of the embodiment described above, can be obtained.

In the first embodiment or the third embodiment, another method or another modulator may be adopted in order to periodically modulate the phase difference between the +1st-order diffracted light beam and the −1st-order diffracted light beam (in order to periodically modulate the phase of the grating image). For example, a method may be adopted, in which any difference is provided between the optical path length of the +1st-order diffracted light beam and the optical path length of the −1st-order diffracted light beam beforehand, and the wavelength of the light source 11 is periodically modulated. Although various methods are available to provide the difference between the optical path lengths of the two optical paths, a method may be adopted, for example, in which a plane-parallel is inserted into only one of the optical paths.

The synchronous detection or demodulation method is applied to the extraction operation using the 1st-order component detection circuit 22, the 2nd-order component detection circuit 23, the 3rd-order component detection circuit 24, and the 4th-order component detection circuit 25 of the first embodiment and the second embodiment. However, another method may be applied, which includes, for example, the amplitude measurement method such as the AC measurement and the amplitude measurement technique at a specified phase or a specified time. In the respective embodiments described above, the direction of modulation of the position of the index diffraction grating 13 (or the index grating 13') is coincident with the X direction (i.e., coincident with the direction of movement of the movable diffraction grating 15 or the movable grating 15'). However, any other direction may also be adopted provided that the direction has at least the component in the X direction. The same or equivalent effect is also obtained by periodically effecting the swinging movement of the index diffraction grating 13 (or the index grating 13') around a predetermined axis (for example, periodically effecting the rotational movement around an axis parallel to the Y axis), in place of the linear vibration of the index diffraction grating 13 (or the index grating 13').

In the encoder of the first embodiment or the second embodiment, the modulation waveform is set to the sine wave. However, it is also allowable to set another waveform in which the rising and the falling are symmetrical with each other. For example, it is also allowable to set, for example, a triangular wave. In the encoder of the third embodiment, the modulation waveform is set to have the sawtooth-shaped form. However, it is also allowable to set another waveform in which the rising and the falling are asymmetrical with each other.

Any artifice may be applied to the encoder according to any one of the embodiments described above in order to improve the detection accuracy of the displacement. For example, the following construction may also be adopted. That is, an optical system (fixed index grating for the correction purpose), which detects the center position (offset) of the periodic modulation, is added. An output signal of the optical system is applied to the modulation factor control circuit 28 so that the modulation factor control circuit 28 performs the control to maintain the offset to be constant.

A rotary encoder may be constructed by applying the linear encoder according to any one of the embodiments described above.

Fourth Embodiment

A fourth embodiment will be explained below. This embodiment relates to a photoelectric encoder of the diffracted light beam interference system. Only the difference from the first embodiment (FIG. 1) will be herein explained. The difference resides in the optical system part.

Figure 9:
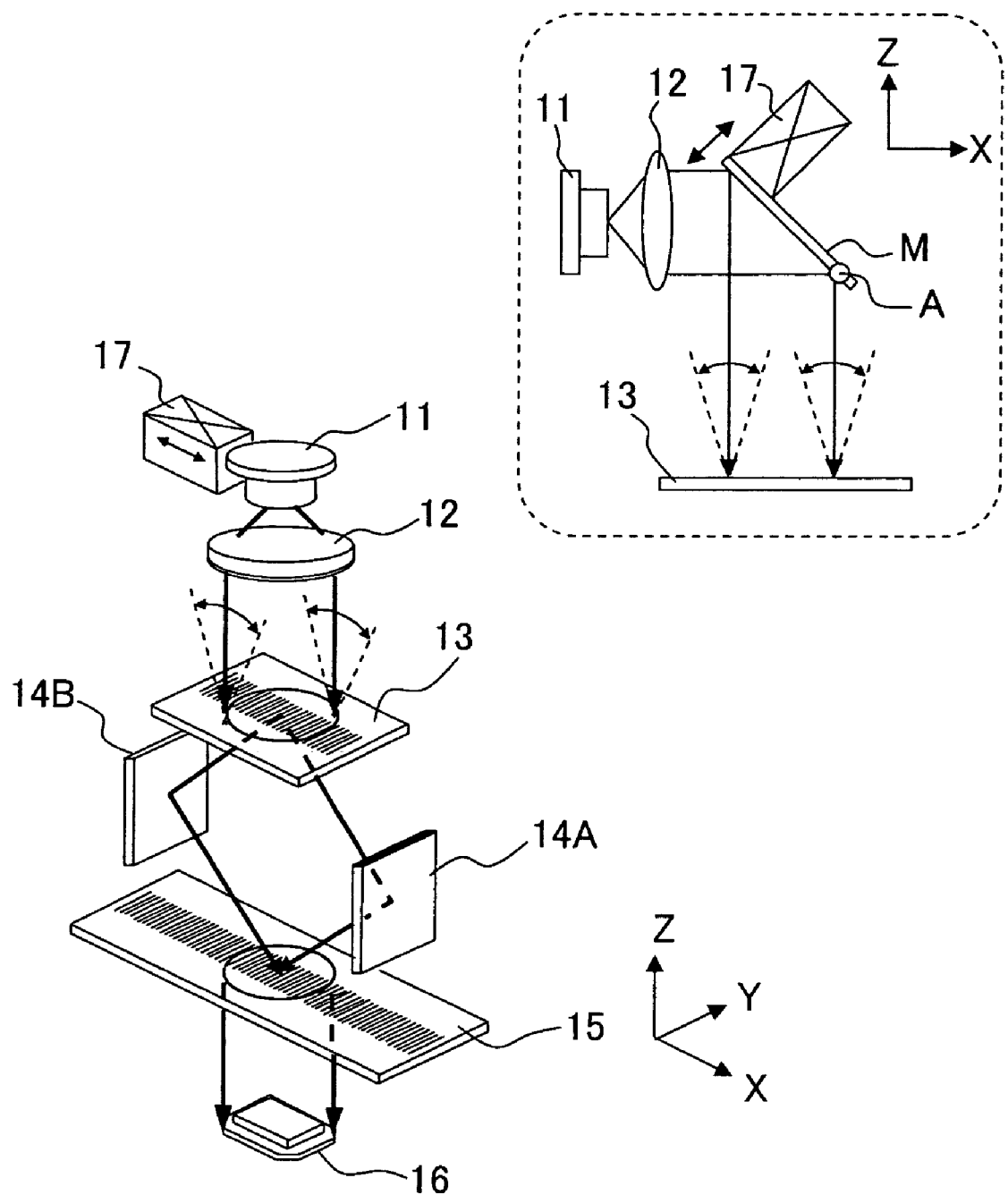
FIG. 9 illustrates an encoder according to a fourth embodiment.

FIG. 9 shows a construction of the optical system part of the encoder of this embodiment. As shown in FIG. 9, an actuator 17, which serves as the modulator of the encoder of this embodiment, vibrates the light source 11 instead of the index diffraction grating 13. Owing to the vibration, the position of the light source 11 is periodically modulated in the X direction (=direction of movement of the movable diffraction grating 15) on the basis of a predetermined position in the same manner as the index diffraction grating 13 of the first embodiment. In this case, the angle of incidence of the illumination light beam allowed to come from the collimator lens 12 into the index diffraction grating 13 is periodically modulated in the direction indicated by the arrow shown in FIG. 9. The direction of modulation is about the axis which is parallel to the Y axis (=grating line direction).

When the angle of incidence is modulated in this direction, then the phase of the grating image on the movable diffraction grating 15 is modulated substantially in the same manner as in the first embodiment, and the interference signal I from the light-receiving element 16 is also changed in a time-dependent manner substantially in the same manner as in the first embodiment. Therefore, also in the encoder of this embodiment, it is possible to obtain the effect which is substantially the same as or equivalent to that of the first embodiment.

The feature of this embodiment is in the change of the optical system part of the first embodiment (diffracted light beam interference system). However, the same or equivalent change may be made for another embodiment (shadowgraph system) based on the different principle and for the optical system part of still another embodiment having the different circuit part.

In the case of the encoder based on the shadowgraph system (FIG. 5), the image, which is formed on the movable grating 15', is not the grating image of the index grating 13', but the image is merely the projection image (shadow). However, when the angle of incidence of the illumination light beam is modulated in the same manner as in this embodiment, the position of the projection image is modulated. Therefore, the intensity signal f from the light-receiving element 16 can be changed in a time-dependent manner in the same manner as in the second embodiment. In this embodiment, the direction of modulation of the position of the light source 11 is coincident with the X direction (=moving direction of the movable diffraction grating 15). However, it is also allowable that the direction of modulation is not necessarily coincident with the X direction provided that the direction has at least the component in the X direction.

In this embodiment, the position of the light source 11 is subjected to the modulation. However, as shown in an upper-right frame depicted in FIG. 9, a bending mirror M may be arranged between the collimator lens 12 and the index diffraction grating 13. When the mirror M is subjected to the swinging movement in the direction of the arrow by using an actuator 17, the angle of incidence of the illumination light beam can be modulated in the same manner as described above. The support point of the swinging movement is Point A shown in FIG. 9. In this embodiment, the position of the light source 11 is subjected to the modulation. However, the light source 11 may be arranged at a position separated and away from the encoder. Further, when the light beam emitted from the light source 11 is guided with an optical fiber and the position of the outgoing end is modulated, the angle of incidence of the illumination light beam can be modulated in the same manner as described above. For example, a mirror, which is provided by coating a surface of a quartz crystal oscillator with a reflective film, may be used as the mirror M. The illumination light beam may be modulated by oscillating or vibrating the quartz crystal oscillator itself.

Fifth Embodiment

Figure 10:
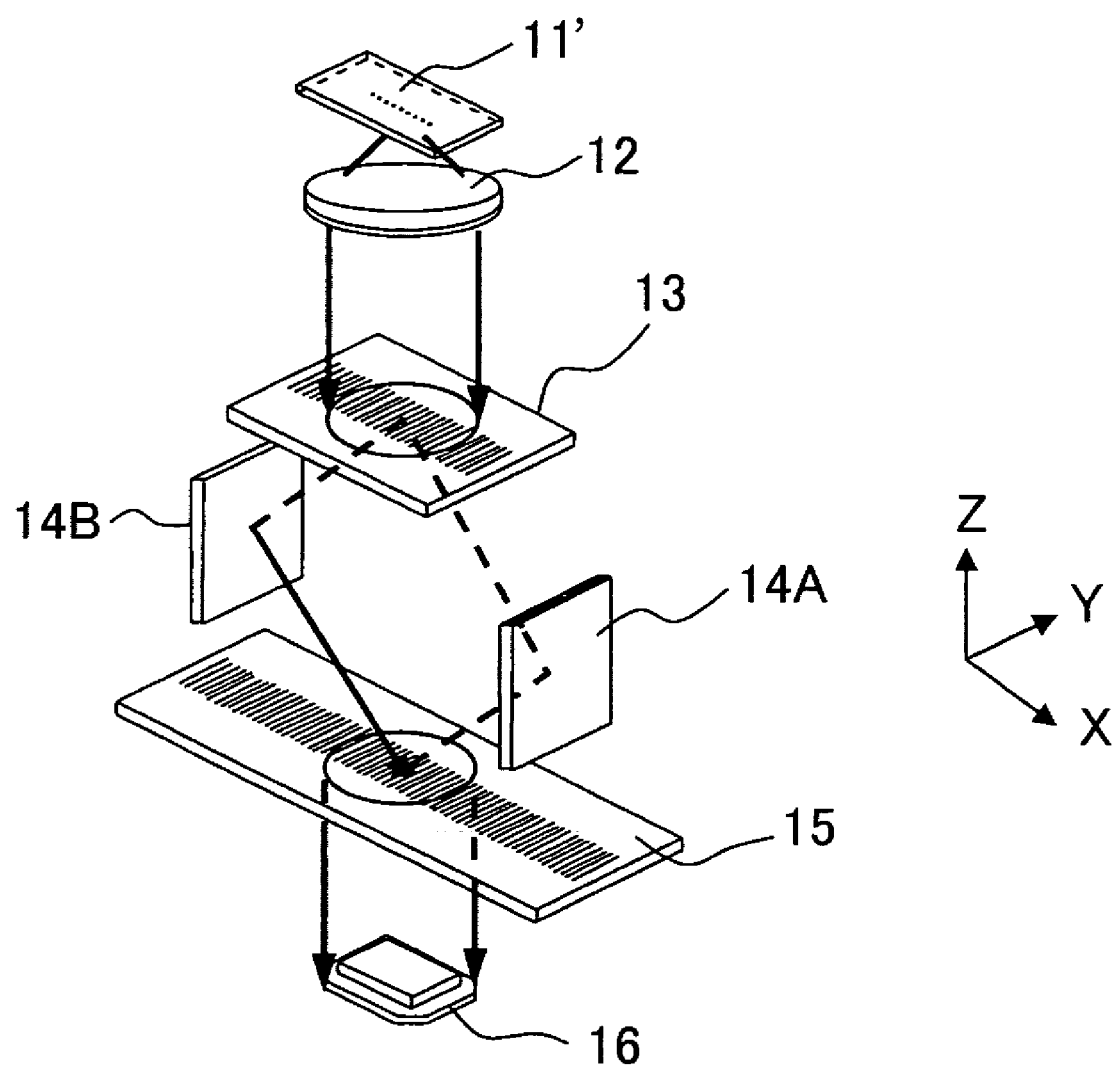
FIG. 10 illustrates an encoder according to a fifth embodiment.

A fifth embodiment will be explained below. This embodiment relates to a photoelectric linear encoder of the diffracted light beam interference system. Only the difference from the first embodiment (FIG. 1) will be herein explained. The difference is in the optical system part. FIG. 10 shows a construction of the optical system part of the encoder of this embodiment. As shown in FIG. 10, the actuator 17 is omitted from the encoder of this embodiment, and a point light source array 11' is provided in place of the light source 11.

The point light source array 11' is a so-called "surface light emission laser" constructed of a plurality of point light sources arranged in the X direction (=moving direction of the movable diffraction grating 15). The apparent arrangement pitch p' (arrangement pitch as viewed from the side of the index diffraction grating 13) of the plurality of point light sources is set to be sufficiently smaller than the grating pitch p. For example, the apparent arrangement pitch p' satisfies p'≦several μm with respect to p=8 μm. The point light source array 11' is driven by an unillustrated light source driving circuit. The light source driving circuit switches the light source to be lighted (i.e., the lighting position) among the plurality of point light sources of the point light source array 11'. When the periodicity is provided for the time-dependent change pattern of the lighting position, the angle of incidence of the illumination light beam can be periodically modulated in the same manner as in the periodic modulation of the position of the light source 11 as performed in the fourth embodiment. Therefore, in this embodiment, the light source driving circuit functions as a modulator for periodically changing the light beam outgoing from the index grating.

The switching operation of the lighting position as described above can be performed at a higher velocity than the modulation of the position of any object. Therefore, in the encoder of this embodiment, the modulation frequency, which is provided upon the modulation, can be enhanced as compared with the frequency provided in the first embodiment. For example, it is possible to provide a frequency of MHz order. Therefore, in the encoder of this embodiment, it is possible to obtain the same effect as that of the first embodiment as well as the effect to shorten the time required to generate the signal, provided that the apparent arrangement pitch p' of the plurality of point light sources is set to be sufficiently small.

Further, in the encoder of this embodiment, the position of any object is not modulated. Therefore, even when the feedback control is not performed, unlike the first embodiment, it is possible to maintain, for example, the constant modulation factor 2d and the constant center position (offset) of the periodic modulation. Therefore, in the encoder of this embodiment, the circuit part can be simplified, while the same effect as that of the first embodiment is obtained. In the encoder of this embodiment, the posture of the point light source array 11' with respect to the collimator lens 12 may be inclined in order to set the apparent arrangement pitch p', of the plurality of point light sources, to be small.

In this embodiment, the optical system part of the first embodiment (diffraction interference system) is changed. However, the same or equivalent change may be made for another embodiment (shadowgraph system) based on the different principle and for the optical system part of still another embodiment having the different circuit part (i.e. different modulation waveform). A method for realizing various modulation waveforms in the encoder of this embodiment is, for example, as follows.

It is assumed that the number of the point light sources of the point light source array 11' is seven, and the positions of the seven point light sources are referred to as [1], [2], [3], [4], [5], [6], [7] in an order of arrangement. On this assumption, when the time-dependent change pattern of the lighting position is [1]→[2]→[3]→[4]→[5]→[6]→[7]→[1]→[2]→[3]→[4]→[5]→[6]→[7]→[1]→[2]→[3]→[4]→[5]→[6]→[7]→[1]→ . . . , it is possible to realize a sawtooth-shaped modulation waveform.

Figure 11A:
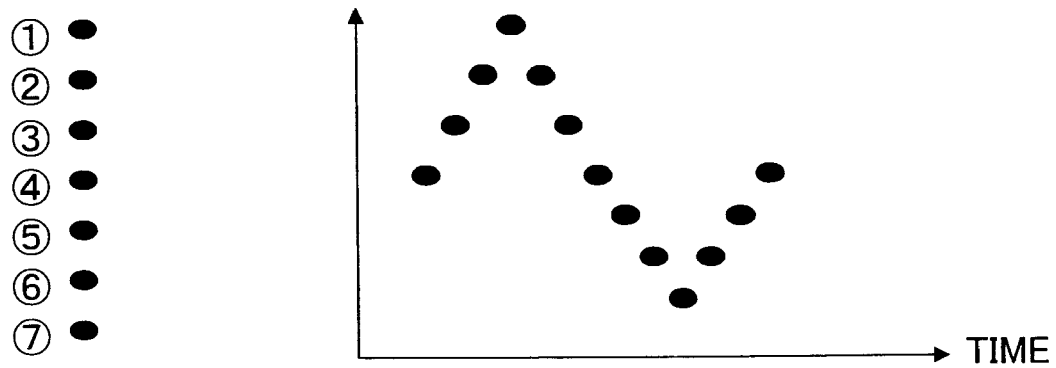
FIGS. 11A and 11B illustrate a method for realizing various modulation waveforms in the encoder according to the fifth embodiment.
Figure 11B:
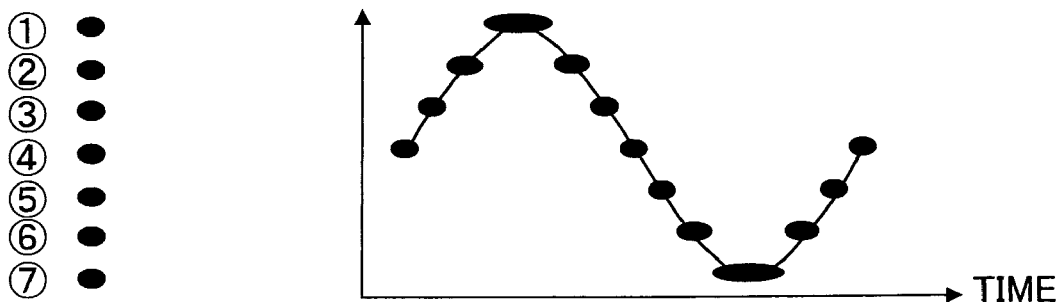

When a time-dependent change pattern ([4]→[3]→[2]→[1]→[2]→[3]→[4]→[5]→[6]→[7]→[6]→[5]→[4]→ . . . ) is adopted as shown in FIG. 11A, it is possible to realize a triangular wave-shaped modulation waveform. When a time-dependent change pattern is adopted as shown in FIG. 11B, it is possible to realize a sine wave-shaped modulation waveform. In the case of the time-dependent change pattern described above, the lighting time is made to differ depending on the lighting position. In FIGS. 11A and 11B, the horizontal axis represents the time, and vertical axis represents the lighting position (number of the point light source).

In the embodiments described above, for example, the actuator or EOM is used for the modulator for periodically changing the light beam allowed to outgo from the index grating. However, the modulator is not limited to the actuator or the EOM. Any unit or device can be used provided that the unit or device is capable of periodically changing the light beam allowed to outgo from the index grating. In another viewpoint, it is also allowable to use a modulator which periodically modulates the relative positional relationship between the index grating and the illumination light beam allowed to come into the index grating. The actuator or EOM as described above also has such a function. However, other than the above, it is also allowable to use, for example, an optical element such as a mirror and a prism which periodically deflects only the direction or the incoming position of the light beam directed from the illumination light source to the index grating without displacing or moving the illumination light source and the index grating.

Further, the index grating itself may be provided with the function to periodically change the light beam outgoing therefrom. Each of the embodiments described above uses the 1st-order and 2nd-order component detection circuits or the zero-order component detection circuit as the displacement detector for detecting the displacement of the movable grating. However, there is no limitation thereto. Any unit or device can be used provided that the unit or the device is capable of detecting the displacement of the movable grating. For example, the light-receiving element itself may be provided with the function as described above.

The embodiments described above are illustrative of the construction in which the movable diffraction grating 15 is displaced with respect to the optical system part of the encoder. However, the movable diffraction grating 15 may be fixed (the fixed movable diffraction grating may be dealt with as a fixed diffraction grating), and the optical system part of the encoder may be displaced together with an unillustrated movable member (measurement objective) with respect to the fixed diffraction grating.

The embodiments described above have been explained by using the diffraction grating as the optical separator element. However, the embodiments are not limited to this construction. For example, a beam splitter, which divides a coherent light beam radiated from a light source into two, may be used as the optical separator element. Also when the beam splitter is used, the two light beams, which have been divided by the beam splitter, may be superimposed and interfered in a same area on the movable diffraction grating 15 respectively. The embodiments described above have been explained by using the diffraction grating as the scale. However, it is also allowable to use a scale having a pattern in which light-transmissive portions and light-shielding portions (for example, areas formed with chromium) are alternately arranged on a transparent scale substrate.

In the embodiments described above, the index diffraction grating 13 and the movable diffraction grating 15 are the phase gratings. However, the index diffraction grating 13 and the movable diffraction grating 15 may be diffraction gratings of the amplitude type.

The embodiments described above have been explained as exemplified by the transmissive type diffraction gratings. However, the movable diffraction grating 15 may be a diffraction grating of the reflection type. In this case, the light-receiving element 16 may be arranged on the side of the index diffraction grating 13.

In the embodiments described above, the arrangement relationship between the index diffraction grating 13 and the movable diffraction grating 15 may be reversed. That is, the diffraction grating, into which the illumination light beam radiated from the light source 11 is allowed to come, may be a movable diffraction grating; and the diffraction grating, into which the diffracted light beam generated by the diffraction grating is allowed to come, may be an index diffraction grating. That is, the light source 11, the collimator lens 12, the movable diffraction grating 15, the index diffraction grating 13, and the light-receiving element 16 may be arranged in this order.

It is not necessarily indispensable that the pitch of the index diffraction grating 13 is the same as that of the movable diffraction grating 15. That is, the index diffraction grating 13 and the movable diffraction grating 15 may have mutually different pitches. In this case, the direction, in which the diffracted light beams generated by the index diffraction grating 13 and the movable diffraction grating 15 outgo, is determined by the wavelength λ of the light and the pitches thereof. Therefore, the mutual arrangement relationship concerning, for example, the light-receiving element 16 and the optical system between the index diffraction grating 13 and the movable diffraction grating 15 may be appropriately determined in accordance with the pitches of the respective diffraction gratings.

According to the present invention, the photoelectric encoder is realized, which makes it possible to correctly generate the signal indicating the displacement of the movable member even when the grating undergoes the posture fluctuation. Therefore, the photoelectric encoder is especially useful in various environments in which the posture fluctuation easily arises in the grating.

What is claimed is:

1. A photoelectric encoder comprising:
   a light source which radiates an illumination light beam;
   a movable grating which has grating lines and which is displaceable in a direction intersecting the grating lines;
   an index grating which serves as a reference for displacement of the movable grating;
   a light-receiver which receives the illumination light beam via the movable grating and the index grating;
   a modulator which periodically changes a phase of a light outgoing from the index grating; and
   a displacement detector which detects the displacement of the movable grating based on the illumination light beam received by the light-receiver.

2. The photoelectric encoder according to claim 1, wherein the modulator periodically modulates a relative positional relationship between the index grating and the illumination light beam incoming into the index grating.

3. The photoelectric encoder according to claim 1, wherein the modulator periodically changes a position of the index grating.

4. The photoelectric encoder according to claim 1, wherein the modulator periodically changes an angle of the illumination light beam radiated from the light source into one of the index grating and the movable grating.

5. The photoelectric encoder according to claim 4, wherein the light source radiates the illumination light beam as a plurality of illumination light beams having mutually different angles, and the modulator periodically switches the plurality of illumination light beams.

6. The photoelectric encoder according to claim 1, wherein the modulator periodically changes a position of one of a projection image and a grating image of the index grating on the movable grating.

7. The photoelectric encoder according to claim 1, wherein each of the movable grating and the index grating is a diffraction grating, and an optical system is arranged to form a grating image of the index grating on the movable grating by a pair of diffracted light beams generated by the index grating.

8. The photoelectric encoder according to claim 7, wherein the optical system includes a reflection member which deflects the pair of diffracted light beams respectively so as to overlay the pair of diffracted light beams in a same area on the movable grating.

9. The photoelectric encoder according to claim 7, wherein the modulator periodically changes a phase difference between the pair of diffracted light beams.

10. The photoelectric encoder according to claim 1, wherein:
    the modulator performs periodic change of the light with a waveform in which rising and falling are symmetrical with each other; and
    the displacement detector extracts, as a signal of the displacement, a specified frequency component of time-dependent change of an intensity of the illumination light beam received by the light-receiver.

11. The photoelectric encoder according to claim 1, wherein:
    the modulator performs periodic change of the light with a waveform in which rising and falling are asymmetrical with each other; and
    the displacement detector extracts, as a signal of the displacement, a phase of time-dependent change of an intensity of the illumination light beam received by the light-receiver.

12. The photoelectric encoder according to claim 1, wherein the displacement detector further includes a control unit which generates a signal of an amplitude of periodic change of the light together with a signal of the displacement and which monitors the signal of the amplitude and controls the modulator to make the signal of the amplitude to be constant.

13. The photoelectric encoder according to claim 1, wherein the displacement detector further includes a control unit which generates a signal of a light amount of the illumination light beam together with a signal of the displacement and which monitors the signal of the light amount and controls the light source to make the signal of the light amount to be constant.

14. The photoelectric encoder according to claim 1, wherein the light-receiver has a single light-receiving element.

15. The photoelectric encoder according to claim 1, wherein the modulator has an actuator which actuates one of the index grating and the light source.

16. The photoelectric encoder according to claim 1, wherein:
    the light source has a point light source array; and
    the modulator drives the point light source array.

17. A photoelectric encoder comprising:
    a light source which radiates an illumination light beam;
    a scale which has a pattern arranged in a predetermined direction;
    a reference member which makes displacement relative to the scale and which serves as a reference for the displacement;
    a light-receiver which receives the illumination light beam via the scale and the reference member;
    a modulator which periodically modulates the illumination light beam in a direction of the displacement during a period in which the scale and the reference member are relatively displaced; and
    a displacement detector which detects the relative displacement of the scale and the reference member based on the illumination light beam received by the light-receiver.

18. The photoelectric encoder according to claim 17, wherein the modulator periodically modulates a relative positional relationship between the reference member and the illumination light beam incoming into the reference member.

19. The photoelectric encoder according to claim 17, wherein the modulator periodically modulates an angle of incidence of the illumination light beam with respect to the reference member.

20. The photoelectric encoder according to claim 17, wherein the light source is a point light source array, and the modulator drives the point light source array.

21. The photoelectric encoder according to claim 17, wherein the scale is formed by a transmissive type diffraction grating having a plurality of grating lines arranged in the predetermined direction.

22. The photoelectric encoder according to claim 17, wherein the light-receiver has a single light-receiving element.

* * * * *